July 2, 1940.    R. E. SNELL    2,206,554
FASTENING DEVICE
Filed Jan. 4, 1940
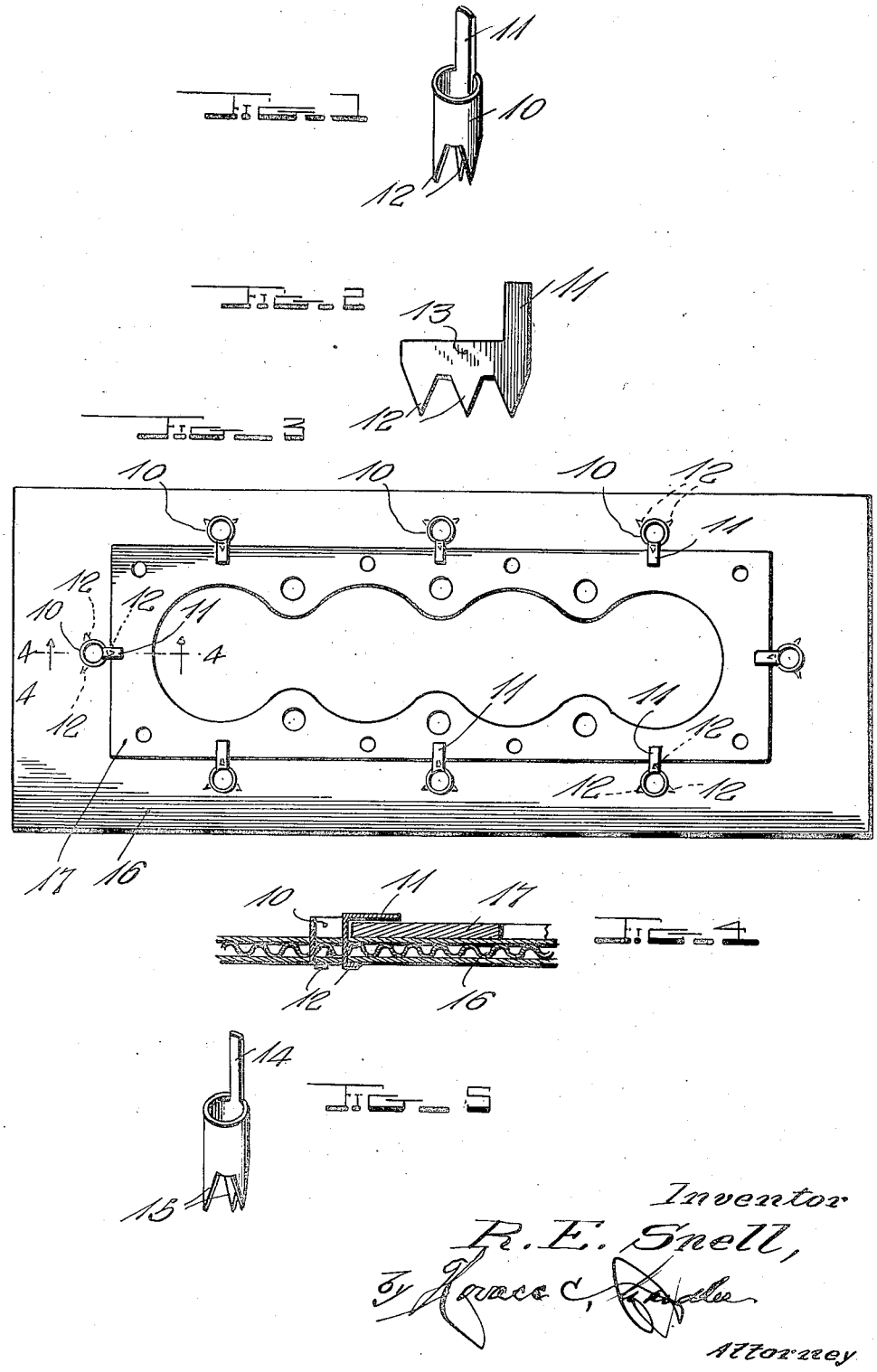
Inventor
R. E. Snell,
by Horace C. _____
Attorney Patented July 2, 1940

2,206,554

UNITED STATES PATENT OFFICE 2,206,554

FASTENING DEVICE

Robert E. Snell, Belleville, N. Y.

Application January 4, 1940, Serial No. 312,427

2 Claims. (Cl. 85—11)

This invention relates to fastening devices and has for its principal object to provide a device for fastening gaskets, and other articles which should be preserved in a substantially flat condition, to backing boards, for protective purposes.

For illustrative purposes, the invention will be described herein as used in connection with cylinder head gaskets. It is essential that such gaskets be maintained in a flat and unfolded position during shipment and while in the stock of a dealer, whether on display or in storage. It has been common practice in the past to protect the gaskets against damage by laying them flat upon a backing consisting of a piece of cardboard or other suitable material to which they are attached with the use of an adhesive.

A further object is to provide a fastener for the purpose stated which will hold a gasket securely upon its backing, which possesses advantages in points of simplicity, and which at the same time proves itself inexpensive in cost of manufacture.

With the foregoing and other objects in view, the invention will be best understood from the description of the accompanying drawing, in which Fig. 1 is a perspective view illustrating one form of the invention, Fig. 2 is a plan view of the blank from which the form illustrated in Fig. 1 is formed, Fig. 3 is a plan view illustrating the invention in use for holding a gasket in position on a backing board, Fig. 4 is a detail sectional view on the line 4—4 of Fig. 3, and Fig. 5 is a perspective view illustrating the invention formed from a section of tubing instead of from a blank such as is illustrated in Fig. 2.

As shown in Fig. 1 of the drawing, the fastener comprising the present invention includes a body portion 10 in the form of an open-ended cylinder. Formed integral with the wall of the cylindrical body portion at one of its ends, is a finger 11 which extends longitudinally therefrom, and formed integral with the wall of the body portion 11, at its other end, in spaced relation, are sharply pointed tangs 12 which extend in a direction opposite to that of the finger 11.

The fastener is preferably formed from a flat blank of relatively thin pliable sheet metal, the shape of which blank is shown in Fig. 3. As will be noted, the blank includes a substantially rectangular body portion 13 from one end of one longitudinal edge of which the finger 11 extends, while the tangs 12 extend, in spaced relation, from the opposite edge thereof. The blanks may be made by stamping or in any other suitable manner.

The forming of the blank into the completed fastener, as shown in Fig. 1, is accomplished by the single step of bending the body portion 13 of the blank longitudinally into substantially cylindrical form.

In Fig. 5 there is shown a form of the invention constructed from a section of metal tubing having a thin, pliable wall. To produce this form of the fastener, the tube section is cut away at opposite ends, in any suitable manner, to produce the finger 14 and the tangs 15.

When putting the present invention to use, as shown in Figs. 3 and 4, backing board 16, preferably formed of cardboard of the cellular type, or other material sufficiently stiff for the purpose and penetrable by the tangs of the fastener, is first placed upon a hard, flat support of suitable size, such as a metal plate, after which the gasket is positioned flat and centrally thereon. A number of the fasteners suitable for holding the gasket firmly in position on the backing are then attached to the latter in surrounding relation to the gasket and close to its edges with the fingers of the fasteners adjacent thereto. The fasteners are thus attached by holding each in its proper position and with its tangs in engagement with the upper face of the backing, after which the upper end of the cylindrical body portion of the fastener is struck with a hammer. This forces the tangs through the backing and into contact with the support on which the backing rests, thus causing the tangs to bend over and engage the under face of the backing in a manner similar to riveting. With the use of some types of backing material, it will be found that the tangs may be forced therethrough by pressure of the thumb instead of with the use of a hammer. After the fasteners have been thus attached to the backing, their fingers 11 are bent over into contact with the gasket with the use of a hammer or otherwise, depending upon the pliability of the metal of which the fasteners are made.

It will be understood that, if desired, the cylindrical body portion 10 may be made sufficiently long to permit the fastener to be used for attaching a number of gaskets to a backing board, also that the fastener is not limited to the use set forth herein, but may be used as a fastener for any purpose to which it is suited.

What is claimed, is:

1. A fastener comprising a substantially cylindrical body portion, a finger formed integral with and extending longitudinally from one end of said body portion, and pointed tangs formed integral with and extending longitudinally from the other end of the body portion, said finger and tangs being adapted to be bent to extend laterally from said body portion.

2. A fastener made from a flat blank of pliable metal bent into a substantially cylindrical body portion, a finger extending from one end of said body portion, and pointed tangs extending from the opposite end of said body portion.

ROBERT E. SNELL.